US012664158B1

(12) United States Patent
Rushforth et al.

(10) Patent No.: US 12,664,158 B1
(45) Date of Patent: Jun. 23, 2026

(54) MULTICORE DATA DOWNSCALING AND ROUTING VISUALIZATION SYSTEMS AND RELATED METHODS

(71) Applicant: Arizona Board of Regents acting for and on behalf of Northern Arizona University, Flagstaff, AZ (US)

(72) Inventors: Richard Rushforth, Flagstaff, AZ (US); Benjamin L Ruddell, Flagstaff, AZ (US)

(73) Assignee: Arizona Board of Regents acting for and on behalf of Northern Arizona University, Flagstaff, AZ (US)

( * ) Notice: Subject to any disclaimer, the term of this patent is extended or adjusted under 35 U.S.C. 154(b) by 0 days.

(21) Appl. No.: 19/179,827

(22) Filed: Apr. 15, 2025

Related U.S. Application Data

(62) Division of application No. 17/935,058, filed on Sep. 23, 2022, now Pat. No. 12,298,971.

(60) Provisional application No. 63/263,468, filed on Nov. 3, 2021, provisional application No. 63/261,642, filed on Sep. 24, 2021.

(51) Int. Cl.
| | |
|---|---|
| *G06F 17/30* | (2006.01) |
| *G06F 16/245* | (2019.01) |
| *G06F 16/28* | (2019.01) |

(52) U.S. Cl.
CPC .......... *G06F 16/245* (2019.01); *G06F 16/284* (2019.01)

(58) Field of Classification Search
CPC ........ G06F 16/13; G06F 16/24; G06F 16/156; G06F 3/1297; G06N 3/00; G06N 5/00;

G05B 13/00; H03M 7/30; H04N 9/8042; G06T 9/00
See application file for complete search history.

(56) References Cited

U.S. PATENT DOCUMENTS

| | | | |
|---|---|---|---|
| 6,377,544 B1 | 4/2002 | Muthukrishnan | |
| 6,996,066 B1 | 2/2006 | Liu | |
| 2011/0215948 A1 | 9/2011 | Borgerson | |
| 2014/0058775 A1* | 2/2014 | Siig ........................ | G06Q 10/06 705/7.12 |
| 2018/0060808 A1* | 3/2018 | Borgerson ......... | G06Q 10/0831 |

(Continued)

OTHER PUBLICATIONS

Dijkstra, E.W., "A Note on Two Problems in Connexion with Graphs," Numerische Mathematik 1, pp. 269-271, (1959).

(Continued)

*Primary Examiner* — Hung D Le
(74) *Attorney, Agent, or Firm* — IPTechLaw

(57) ABSTRACT
Implementations of a system for downscaling commodity flow data may include a first commodity flow database at a first level of geographic/temporal granularity, a second commodity flow database including commodity data for a plurality of commodities at a second level of geographic/temporal granularity and a group of high speed multiple core processor clusters where each core of may be assigned to process data associated with a commodity from the second commodity flow database and data of the first commodity flow database. The system may also include a downscaling module to generate downscaled and a quality check module to generate quality checked data; and a merging module configured for merging downscaled data and quality checked data in parallel. The system may also include a database module configured for writing data asynchronously according to a first-in first-out queue system in a commodity flow database within a period of hours.

15 Claims, 12 Drawing Sheets

(56) References Cited

U.S. PATENT DOCUMENTS

| | | | |
|---|---|---|---|
| 2018/0364059 A1* | 12/2018 | Calinao | G06N 5/046 |
| 2019/0325199 A1 | 10/2019 | Wang | |
| 2020/0193339 A1 | 6/2020 | Bennett | |
| 2020/0293960 A1* | 9/2020 | Weaver | G06Q 10/0635 |
| 2020/0342372 A1 | 10/2020 | Ruddell et al. | |
| 2020/0342465 A1 | 10/2020 | Ruddell et al. | |
| 2021/0107372 A1* | 4/2021 | Viswanathan | B60L 53/62 |
| 2021/0217068 A1 | 7/2021 | Xu | |
| 2021/0256735 A1 | 8/2021 | Tourapis | |
| 2022/0405663 A1* | 12/2022 | Kezunovic | G06Q 10/06311 |
| 2023/0186201 A1 | 6/2023 | Cella | |
| 2023/0206329 A1 | 6/2023 | Cella | |
| 2023/0214925 A1 | 7/2023 | Cella | |
| 2023/0222454 A1 | 7/2023 | Cella | |

OTHER PUBLICATIONS

Gurney, et al., "The Vulcan Version 3.0 High-Resolution Fossil Fuel $CO_2$ Emissions for the United States," Journal of Geophysical Research: Atmospheres, 125, e2020JD032974. https://doi.org/10.1029/2020JD032974.

Rushforth, et al., "A spatially detailed blue water footprint of the United States economy," Hydrol. Earth Syst. Sci., 22, 3007-3032, 2018. https://doi.org/10.5194/hess-22-3007-2018.

Rushforth, "Quantifying the Hydro-Economic Dependencies of US Cities: Development of the National Water Economy Database," Arizona State University, A Dissertation Presented in Partial Fulfillment of the Requirements for the Degree Doctor of Philosophy. pp. 1-183. Aug. 2016.

* cited by examiner

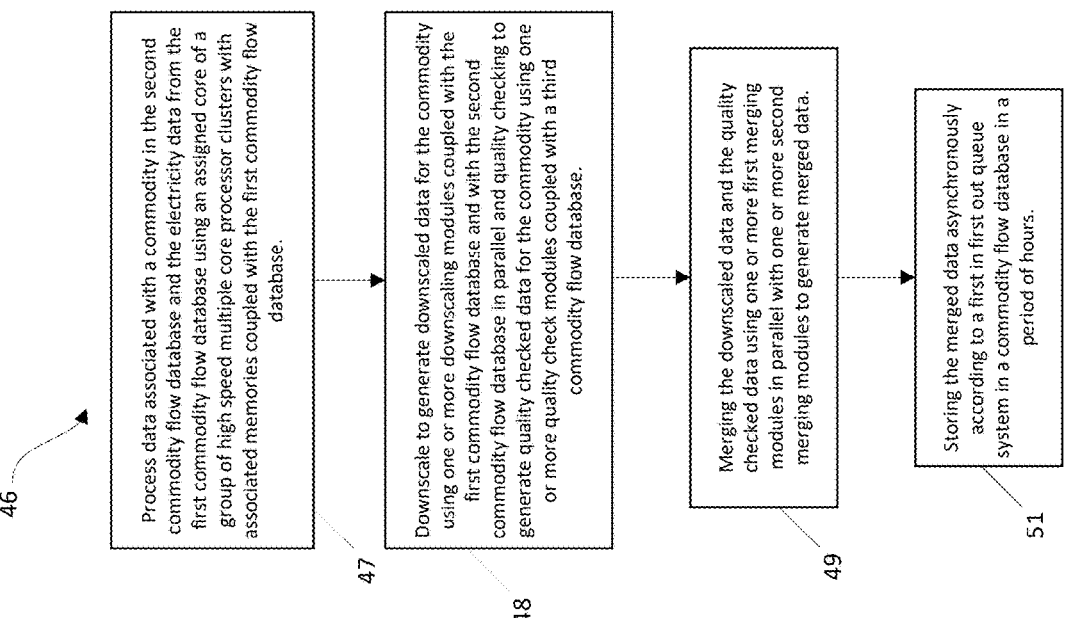

46

Process data associated with a commodity in the second commodity flow database and the electricity data from the first commodity flow database using an assigned core of a group of high speed multiple core processor clusters with associated memories coupled with the first commodity flow database.

47

Downscale to generate downscaled data for the commodity using one or more downscaling modules coupled with the first commodity flow database and with the second commodity flow database in parallel and quality checking to generate quality checked data for the commodity using one or more quality check modules coupled with a third commodity flow database.

48

Merging the downscaled data and the quality checked data using one or more first merging modules in parallel with one or more second merging modules to generate merged data.

49

Storing the merged data asynchronously according to a first in first out queue system in a commodity flow database in a period of hours.

Provide one or more commodity flow databases including commodity and embedded resource flow data.

42

Provide an electric flow database that includes electricity data.

43

Merge the commodity and embedded resource flow data from the one or more commodity flow databases with the electricity data from the electric flow database using a merging module to form a first commodity flow database.

44

Generate a second commodity flow database including commodity data for a plurality of commodities.

MULTICORE DATA DOWNSCALING AND ROUTING VISUALIZATION SYSTEMS AND RELATED METHODS

CROSS REFERENCE TO RELATED APPLICATIONS

This application is a divisional application of the earlier U.S. Utility patent application Ser. No. 17/935,058, entitled "Multicore data downscaling systems and related methods" to Rushforth et al. which was filed on Sep. 23, 2022, now pending, which document claims the benefit of the filing date of U.S. Provisional Patent Application 63/261,642, entitled "Multicore data downscaling systems and related methods" to Rushforth et al. which was filed on Sep. 24, 2021 (the '642 Provisional), and also claims the benefit of the filing date of U.S. Provisional Application Ser. No. 63/263,468, entitled "Supply chain routing visualization systems and related methods" to Rushforth et al., which was filed on Nov. 3, 2021 (the '468 provisional), the disclosures of each of which are hereby incorporated entirely herein by reference.

GOVERNMENT LICENSE RIGHTS

The subject matter disclosed herein was made with government support under National Science Foundation Award 1639529 and under the Office of the Director of National Intelligence, Intelligence Advanced Research Projects Activity Grant 2021-21010800001. The government has certain rights in the invention.

BACKGROUND

1. Technical Field

Aspects of this document relate generally to systems and methods, such as systems and methods for multicore data downscaling and routing visualization systems and methods for data processing, aggregation, extrapolation, and creating displays and graphs illustrating the flow of goods, commodities, people, or other supply chain related items between two or more points in a geographical area.

2. Background

Data processing systems receive and store data in systems like databases. Databases organize data in various ways including tables to allow the information to be retrieved in response to receiving a query. The data in the database can be of various kinds including data relating to supply chains.

SUMMARY

Implementations of a system for downscaling commodity flow data may include one or more commodity flow databases including commodity and embedded resource flow data; an electric flow database including electricity data; and a merging module configured to merge the data from the one or more commodity flow databases and the electric flow database to form a first commodity flow database including electricity data at a first level of geographic granularity and first level of temporal granularity. The system may also include a second commodity flow database including commodity data for a plurality of commodities at a second level of geographic granularity and at a second level of temporal granularity and a group of high speed multiple core processor clusters with associated memories operatively coupled with the first commodity flow database where each core of the group of high speed multiple core processors may be assigned to process data associated with a commodity from the second commodity flow database and the electricity data of the first commodity flow database using the associated memory. The system may also include one or more downscaling modules operatively coupled with the first commodity flow database and with the second commodity flow database to generate downscaled data for the commodity; one or more quality check modules operatively coupled with a third commodity flow database to generate quality checked data for the commodity; and one or more merging modules configured for merging downscaled data and quality checked data in parallel to form merged data. The system may also include a database module configured for writing the merged data received from each processor asynchronously according to a first-in first-out queue system in a commodity flow database within a period of hours.

Implementations of systems for downscaling commodity flow data may include one, all, or any of the following:

The one or more downscaling modules may be a geographic downscaling module configured to use one of a ridge regression or elastic net regression to generate the downscaled data for the commodity. The downscaled data may be geographically downscaled data.

The one or more downscaling modules may be a temporal downscaling module.

The temporal downscaling module may use a Vulcan method to generate downscaled data for the commodity. The downscaled data may be temporally downscaled data.

The one or more quality check modules may be a geographic quality check module.

The one or more quality check modules may be a temporal quality check module.

The first merge module may merge geographically downscaled commodity data and quality checked geographic data for the commodity from the one or more quality check modules.

The second merge module may merge temporal downscaled data and quality checked temporal data for the commodity from the one or more quality check modules.

Implementations of a method of downscaling commodity flow data may include providing one or more commodity flow databases including commodity and embedded resource flow data; providing an electric flow database including electricity data; and merging the commodity data from the one or more commodity flow databases and the electricity data from the electric flow database using a merging module to form a first commodity flow database including electricity data at a first level of geographic granularity and at a first level of temporal granularity. The method may include generating a second commodity flow database including commodity data for a plurality of commodities at a second level of geographic granularity and at a second level of temporal granularity; processing data associated with a commodity in the second commodity flow database and the electricity data from the first commodity flow database using an assigned core of a group of high speed multiple core processor clusters with associated memories operatively coupled with the first commodity flow database; and downscaling to generate downscaled data for the commodity using one or more downscaling modules coupled with the first commodity flow database and with the second commodity flow database in parallel and quality checking to generate quality checked data for the commodity using one or more quality check modules operatively coupled with a third commodity flow database. The method may include merging the downscaled data and the quality checked data using one or more first merging modules in parallel with one or more second merging modules to generate merged data; and storing the merged data asynchronously according to a first in first out queue system in a commodity flow database within a period of hours.

Implementation of a method of downscaling commodity flow data may include one, all, or any of the following:

The method may include where downscaling to generate downscaled data for the commodity further may include geographic downscaling using one of a ridge regression or elastic net regression to form geographically downscaled data.

Downscaling to generate downscaled data for the commodity further may include temporal downscaling using a Vulcan method to form temporally downscaled data.

Quality checking to generated quality checked data for the commodity further may include where a quality check may be geographic.

Quality checking to generated quality checked data for the commodity further may include where a quality check may be temporal.

The one or more first merging modules may merge the geographically downscaled data and the quality checked data.

The one or more second merging modules may merge the temporally downscaled data the and quality checked data.

Implementations of a method of visualizing a flow of a commodity in a supply chain route may include generating geographic area centroid coordinate data using a geographic area centroid module for a starting point and an endpoint in response to receiving a selection of a geographic area by a user and storing the geographic area centroid coordinate data in a centroid database; generating infrastructure polyline shapefile data and storing the infrastructure polyline shapefile data in a shapefile database; and generating a shortest path route using a shortest path module. The shortest path may be generated using the geographic area centroid coordinate data and the infrastructure polyline shapefile data. The method may include storing the shortest path route in a route database; using a destination geographic area to select commodity data and route data from a commodity flow database for merging and storing in a merged route database; and determining from the merged route database a route corresponding with a unique route segment and storing each unique route segment between the starting point and the end point in a database of unique route segments. The method may include for each of the unique route segments stored in the database of unique route segments, generating weighted route data and storing the weighted route data in a weighted route database; and generating a visualization of the shortest path route using the weighted route data in the weighted route database.

Implementations of a method of visualizing a flow of a commodity in a supply chain route may include one, all, or any of the following:

Generating weighted route data and storing the weighted route data in a weighted route database further may include using a looping process to generate and store weighted commodity data associated with a unique route in a weighted route database for the commodity by: selecting each unique route segment; querying the commodity data and the route data associated with the unique route segment from the merged route data database; and performing a sum of a flow of the commodity over the unique segment to form weighted route data for the unique segment. The method may include storing the weighted route data for the unique segment in the weighted route database.

The shortest path module may use Dijikstra's routing algorithm to determine the shortest path route.

Selection of a commodity may be received from a user.

The visualization may indicate a quantity of flow of the commodity by a width of a flow line on the visualization passing across a geographic area.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 8 is a flow diagram of an implementation of a method of generating first and second commodity databases for processing using high speed multicore processors;

FIG. 9 is a flow diagram of an implementation of a method of downscaling data, performing quality checks on data, and asynchronously merging the downscaled and quality checked data for storage within a period of hours;

DESCRIPTION

Figure 1:
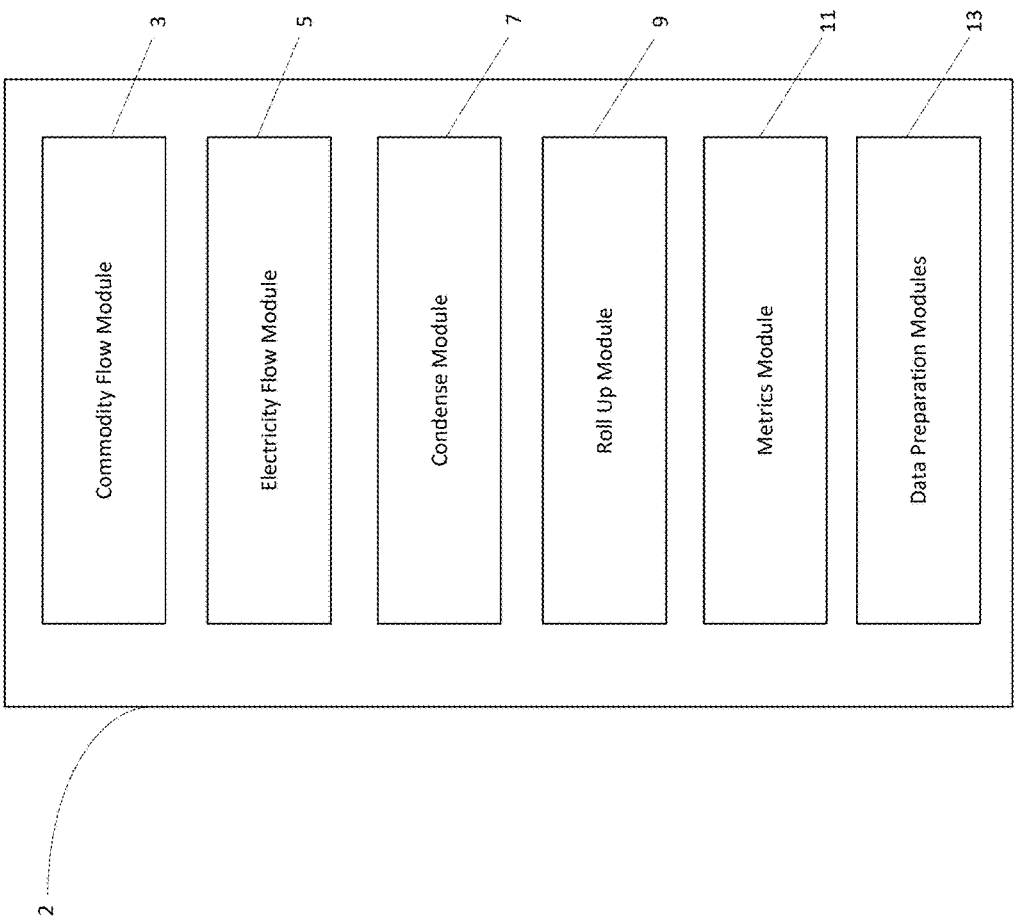
FIG. 1 is a block diagram of the various modules in an implementation of a system for downscaling data.

This disclosure, its aspects and implementations, are not limited to the specific components, assembly procedures or method elements disclosed herein. Many additional components, assembly procedures and/or method elements known in the art consistent with the intended data downscaling and supply chain routing visualization systems and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such data downscaling and routing visualization systems and related methods, and implementing components and methods, consistent with the intended operation and methods.

Implementations of multicore data downscaling and routing visualization systems and methods disclosed herein are used for data processing, aggregation, extrapolation and storage and creating displays and graphs illustrating the flow of goods, commodities, people, or other supply chain related items between two or more points in a geographical area. The ability to execute the various data processing steps, particularly an increased number of data processing operations to generate a more granular commodity flow database from data that is provided at a larger time step or larger geographic area may aid planning and emergency preparedness efforts. However, the theoretical ability to generate the granular/downscaled data given infinite computing time is not that useful as only those system/method implementations that enable completion of the downscaling process within a reasonable time frame using a computing systems are realistic candidates for forming a commodity flow database. Also, the ability to perform the data processing steps for to form one version of the commodity flow database using a system and method implementation capable of allowing the computing power available to a multi-core central processing unit in a personal computing system would be advantageous. Such system and method implementations would certainly improve the functioning of the personal computing system used which previously was unable to complete the data operations in any practical time frame, if at all.

Furthermore, the capability of the system and method implementations disclosed herein to carry out the massively more intensive/detailed computations needed to form a more highly downscaled version of a commodity flow database in a reasonable period of time using high performance computing system (HPC) like those disclosed herein also correspondingly improving the functioning of the HPC system. The supply chain routing visualization systems disclosed herein have the ability of creating computer interfaces that include displays and graphs illustrating the flow of goods, commodities, people, or other supply chain related items between two or more points in a geographical area. These visualization systems are capable of showing how a commodity has moved between an origin(s) and a destination(s).

Information regarding the various method steps of various downscaling and data processing operations used to acquire, process, downscale, store, and/or associate with various geographical locations including information regarding routes and methods of travel between geographical points may be found in U.S. Pat. App. Pub. No. 20200342465 to Ruddell et al., application Ser. No. 16/862,252 ('252 Publication), entitled "Generating geospatial commodity flow datasets with increased special resolution from coarsely-resolved economic datasets," published Oct. 29, 2020 and U.S. Pat. App. Pub. No. 20200342372 ('372 Publication) to Ruddell et al., application Ser. No. 16/862,256 entitled "Generation of geospatial images representing disrupted commodity flows between regions for user-defined scenarios specified via a graphical user interface," published Oct. 29, 2020, the disclosures of each of which are hereby incorporated entirely herein by reference.

In a first aspect, this document discloses various system and method implementations for visualizing a flow of a commodity across a geographical area or region, the use of flow routing methods is employed. In various implementations, flow routing may include, by non-limiting example, the mode of a flow, a route of a flow, a timing of a flow, operator(s) of a flow, waypoints of a flow, or any other physical, geographical, or personal characteristics associated with a flow. Flow routing is a key piece of information for a fused commodity and trade flow database system like that disclosed in the patent application publications previously incorporated by reference.

Flow routing may apply most directly to commodity and trade flows, but also can apply to, by non-limiting example, information flows, financial flows, flows of people, flows of wildlife, flows of nature (currents, winds, etc.), or any other item, quantity, or service capable of being described as moving in a flow. Without the use of routing information, flow data can show only that a good moves between an origin and destination but cannot detail how the good moved between the origin and destination. Knowing how the good moved between the origin and destination can enable the use of the flow data for applications including designing infrastructure systems to carry flows, optimizing the resilience of those systems, adapting those systems when they are disrupted, and/or protecting or attacking those systems. For example, knowing that food moves from a originating producer in Little Rock, AR to Dallas, TX on two different refrigerated trucks operated by two different companies, passing through temporary storage for a specific amount of time at a refrigerated warehouse, using specific roads and bridges, and that the routing occurred at specific dates and times. With this information, a user could, for example, protect that food flow or help it adapt to disruption by defending specific warehouses, roads, or bridges, or by contacting the operators of the trucks and warehouses, or by identifying alternative routes and modes of transit.

The ability to efficiently use routing information in combination with flow information enables the development of visualizations that can be displayed on a computer interface in response to a request from a user to systems for handling supply chain data like those disclosed herein. The various system implementations disclosed herein may be executed using, by non-limiting example, high performance computing systems like clusters and supercomputing systems like those disclosed herein, one or more servers, one or more desktops, a laptop computing system, a cloud computing system, a portable computing system, or any combination thereof. A wide variety of computing systems, telecommunication networks coupling those systems, and computing systems associated with a user requesting a visualization may be used in various system implementations.

Various implementations of methods for constructing a visualization of the routing of a supply chain(s) are disclosed in this application. The various method implementations may be used to identify key parts of a route and also communicate information about how much of a good or goods moves over a particular infrastructure segment, which can allow for highly-precise assessments.

In a second aspect, this document discloses various commodity flow databases. A commodity flow database that includes a comprehensive analysis of the food, energy, and water of the US supply chain has been created by various researchers and is referred to as the FEWSION database. Version 1.0 of the database describes the US supply chain systems for the representative years 2010-2012. The reference time period for FEWSION Version 1.0, and subsequent releases are constrained by "raw" or native source data availability and source data temporal resolution. The 2010-2012 time period for Version 1.0 was dictated by the data time period availability of the Commodity Flow Survey Produced by the United States Census Bureau; the Freight Analysis Framework (FAF) published by Oak Ridge National Laboratories and the U.S. Department of Transportation; and national water use data produced by the United States Geological Survey.

The Version 1.0 data processing workflow (Version 1.0 workflow) was built initially for processing using high-performance computing (HPC) clusters that include multiple CPUs and/or GPUs connected via high speed data communication networks in combination with large quantities of RAM. The data processing method implemented in the Version 1.0 database includes of seven unique steps/modules that ingest, manipulate, analyze, and extract new, novel, unique and useful information from the publicly available datasets describing the production, consumption, and flow of food, energy, and water in the United States.

As illustrated in FIG. 1, an implementation of a system for downscaling data 2 is illustrated. Modules 3-13 are configured to be used in Version 1.0 workflow. In one implementation, the modules 4 and 6 illustrated in FIG. 1, were designed to minimize computational memory requirements while heavily relying on input-output algorithmic methods and data structures, because they were originally developed to run on a personal laptop or other low-performance computing equipment. Initial outputs from these separately executed scripts were published in the peer-reviewed literature by Rushforth and Ruddell entitled "A spatially detailed blue water footprint of the United States economy," *Hydrol. Earth Syst. Sci.* 22, p. 3007-3032 (2018) using methods disclosed in the Ph.D. dissertation of Richard Rushforth entitled "Quantifying the Hydro-Economic Dependencies of US Cities: Development of the National Water Economy Database," Arizona State University (August 2016), the disclosures of each of which are hereby incorporated entirely herein by reference. Further information regarding the method steps of various downscaling and data processing operations used in the system 2 to implement the modules in the Version 1.0 workflow illustrated in FIG. 1 may be found in the '252 and '372 Publications previously incorporated by reference.

In reference to FIG. 1 again, the modules in the system 2 may be modified when implementing Version 1.0 data flow processing by configuring the scripts to adapt for use in an HPC environment by having the method assign one core of a processor in the HPC to one commodity flow in each workflow module. Here, a commodity flow type is defined as all commodity flows of a specific commodity or commodity group for a specific unit for a specific infrastructure combination. In the HPC setup, the Version 1.0 workflow uses job arrays to run each task (individual trade or commodity flow) within a job, allowing the HPC cluster to start jobs on HPC cores as core resources become available. This method of implementation of the Version 1.0 workflow resulted in a total runtime of 4.51 days on Northern Arizona University's Monsoon HPC cluster (Table 1 shows the processing time for each module operation). The Monsoon HPC includes 3824 cores, 24 TB of memory, and 20 NVIDIA GPUs included in 104 interconnected servers using REDHAT ENTERPRISE LINUX and interconnected using INFINIBAND FDR (56 Gb/s) and HDR (200 Gb/s) interconnect switches and nodes capable of operating at a peak of 164 teraflops. The resulting completed Version 1.0 database was 6.8 Tb in size if the database in this instantiation was uncompressed and 768 Gb if compressed.

TABLE 1

| Module Name | Time (d) |
| --- | --- |
| 1) Flows | 0.36 |
| 2) Power | 0.0001 |
| 3) Condense | 0.17 |
| 4) Roll Up | 0.16 |
| 5) Metrics | 2.71 |
| 6) County Data Preparation | 1.05 |
| 7) State Data Preparation | 0.07 |
| Total | 4.51 |

While 4.51 days on an HPC system was an acceptable runtime for the Version 1.0 methods and database, for a Version 2.0 workflow, the HPC system was not capable of completing the task in any reasonable period of time. By comparison, FEWSION Version 2.0 is designed to contain information on multiple benchmark years (1997, 2002, 2007, 2012, 2017) with the ability to infer data between benchmark years (downscale) and utilizes a time series method to predict data years beyond the latest benchmark year. In addition, FEWSION Version 2.0 is designed to ingest, normalize, and downscale international trade data so that the database has high-resolution trade for the entire global to complement high-resolution U.S. domestic trade date. A conservative linear extrapolation of extending the Version 1.0 method flow to the processing required to implement the Version 2.0 data processing demands was approximately 22 days on the Monsoon HPC cluster, which was not a feasible compute time and, as a practical matter, impossible to complete using the processing power available in a personal computing system even with a multicored central processing unit.

As discussed in length in Appendix A to the '642 Provisional previously incorporated by reference, along with the '252 and '372 Publications discuss in detail the sequential functions of each of the processing modules and the identity of the various databases used to generate the Annual FEWSION database of Version 1.0 using the sequential functions of each of the processing modules and using various databases whose identity is also described in length in Appendix A.

The ability to execute the various data processing steps, particularly the increased number of data processing operations to generate the FEWSION Version 1.0 and 2.0 database within a reasonable time frame using various computing systems and the ability of using computing power available to a personal computing system would also be advantageous as it would improve the functioning of the computing system used. Furthermore, the ability to carry out the massively more intensive computations needed to form the FEWSION Version 2.0 database in a reasonable period of time using an HPC system would significantly improve the functioning of that system.

Figure 2:
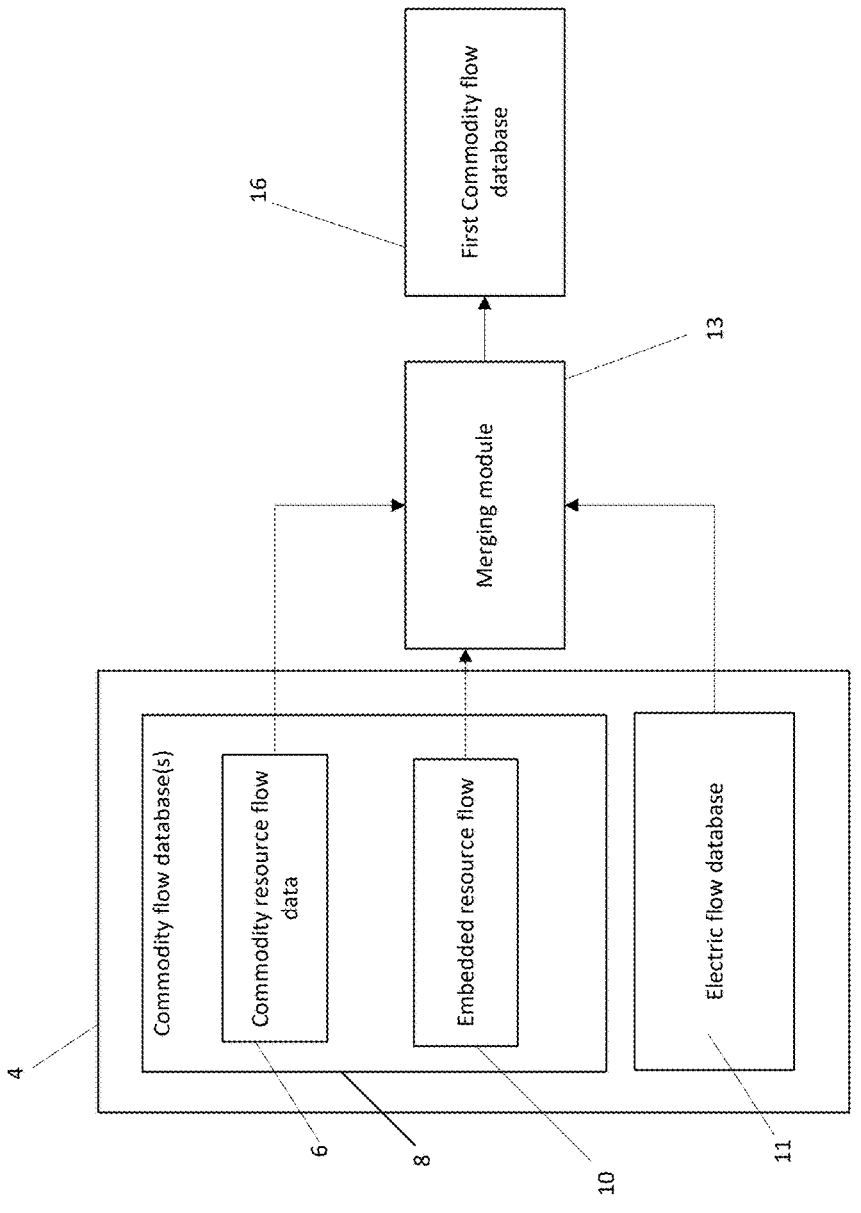
FIG. 2 is a block diagram of an implementation of a system for forming a first commodity flow database.

Referring to FIG. 2, a block diagram of an implementation of a system 4 for forming a first commodity flow database 16 is illustrated. The first commodity flow database 16 is generated by using a merging module 13 operatively coupled with one or more commodity flow databases 8 (in this case, commodity resource flow data database 6 and embedded resource flow data database 10) and an electric flow database(s) 11. The data provided by the one or more commodity flow databases 8 and the electric flow database(s) 11 are merged by the merging module 13 to generate the data that is then stored in the first commodity flow database 16. Because the data is merged using the merging module 13, no up- or downscaling of the data takes place in this system so the first commodity flow database 16 includes data at a first level of granularity and at a first level of temporal granularity. These levels of granularity are the same as those in the one or more commodity flow databases 8 and the electric flow database(s) 11.

Figure 3:
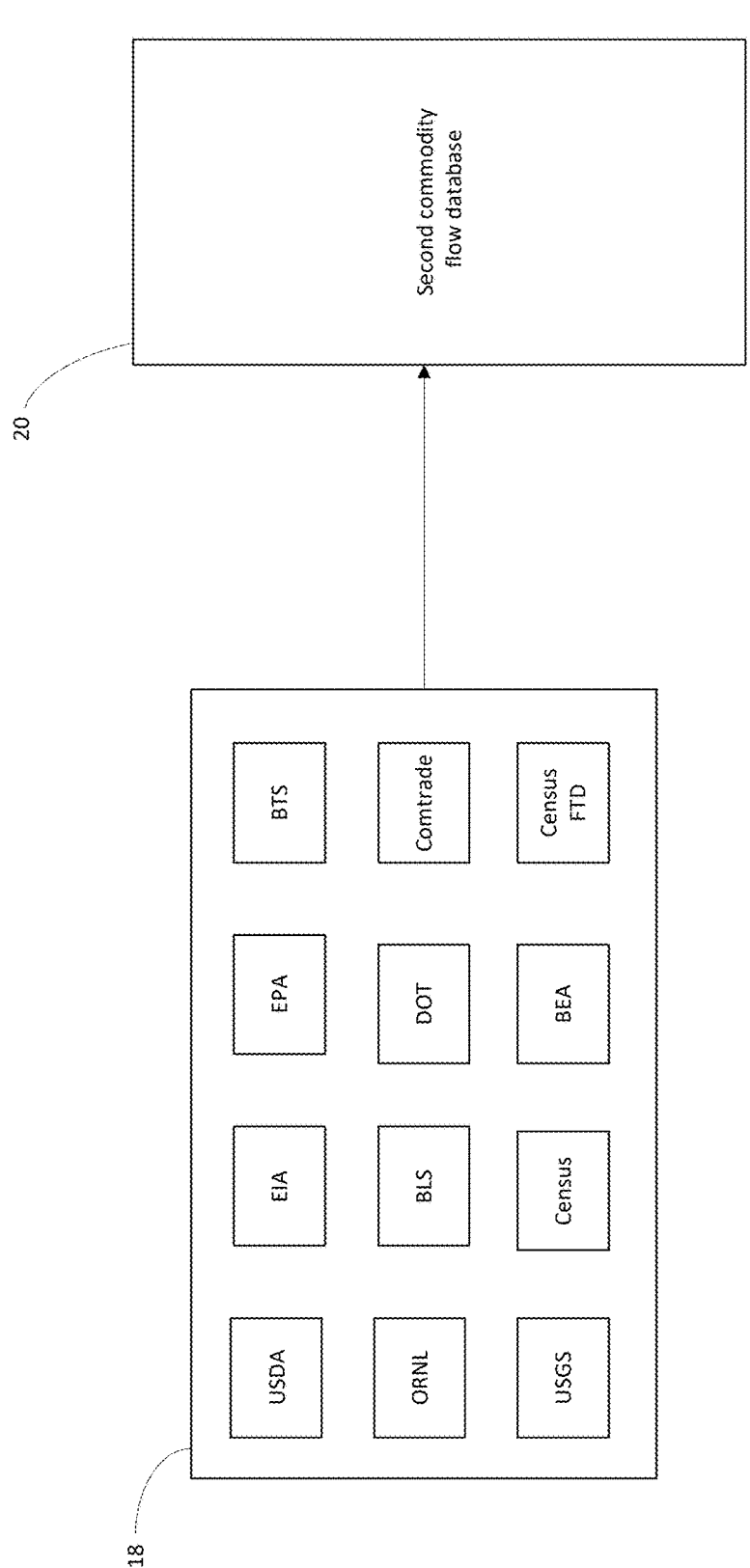
FIG. 3 is a block diagram of an implementation of a system for forming a second commodity flow database.

Referring to FIG. 3, a block diagram of an implementation of a system for forming ae second commodity flow database 20 is illustrated. As illustrated, the second commodity flow database 20 is generated using data for a plurality of commodities stored in various public and private databases 18 at a second level of geographic granularity and a second level of temporal granularity. In this implementation, by non-limiting example, the public and private databases include any listed in the United States Department of Agriculture (USDA) Open Data Catalog, any of the databases available from the Oak Ridge National Laboratory (ORNL), any of the databases available from the United States Geological Survey (USGS), any of the databases available from the United States Energy Information Administration (EIA), any of the databases available from the United States Bureau of Labor Statistics (BLS), United States Census data, any of the databases in the United States Environmental Protection Agency's (EPA) Environmental Dataset Gateway, any of the databases available from the United States Department of Transportation (DOT), any of the databases available from the United States Bureau of Economic Analysis (BEA), any of the databases available from the United States Bureau of Transportation Statistics (BTS), any of the databases available from the United Nations Comtrade Database, and/or any of the database available from the Foreign Trade Division (FTD) of the United States Census. In various system implementations, the data from the various public and private databases may be retrieved and stored in the second commodity flow database or a merging module may be utilized to collect and store the information in an organized coordinated matter (in time sequence, by geographic area/location, etc.) as desired.

Figure 4:
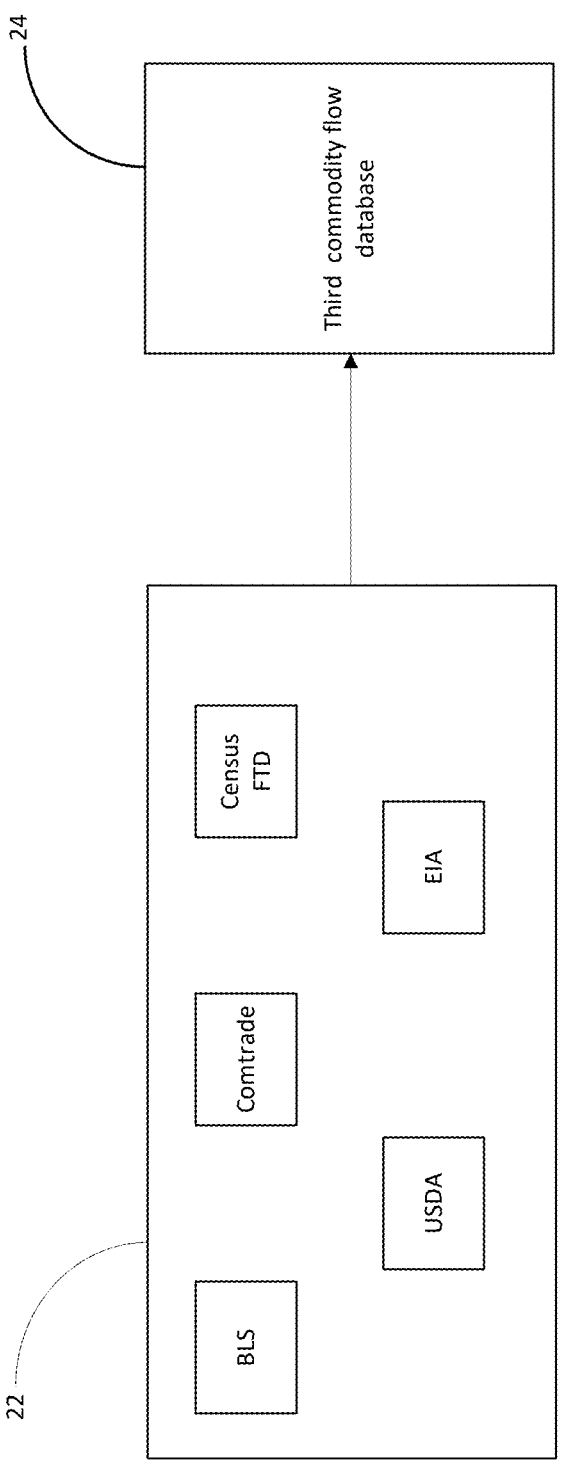
FIG. 4 is a block diagram of an implementation of a system for forming a third commodity flow database.

Referring to FIG. 4, a block diagram of an implementation of a system for forming a third commodity flow database is illustrated. In a particular implementation, the third commodity flow database 24 is generated using an amalgamation of county level data based on transit mode connectivity and the relative share of consumption activities with a metropolitan area using data from the BLS, USDA, EIA, Census FTD and/or Comtrade databases previously mentioned. In other implementations, the third commodity flow database may be generated at the first, second, or a third level of data granularity depending on the granularity of the databases used as sources. Again, a merging module may be employed to assist with retrieving and storing data in the third commodity flow database 24 in various implementations.

Figure 5:
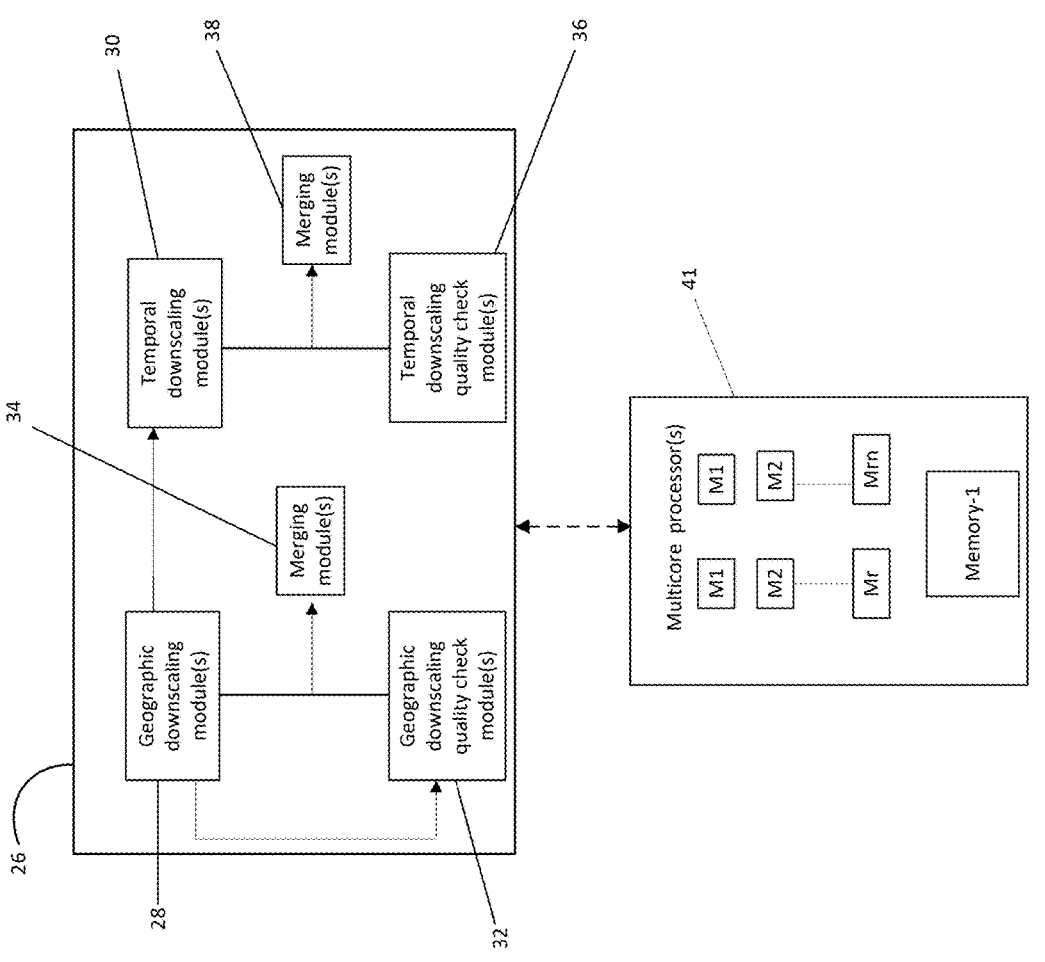
FIG. 5 is an block diagram of an implementation of modules of an implementation of a data downscaling system implemented using one or more multicore processors.

Referring to FIG. 5, a block diagram of an implementation of a set of modules 26 of an implementation of a data downscaling system is illustrated coupled with/implemented by a group 40 of high speed multiple core processors M1, M2, to Mr and M1, M2 to Mrn clustered with associated memories Memory-1 is illustrated. The group of high speed multiple core processors and memory are used to implement the various modules. As illustrated, the set of modules 26 includes one or more downscaling modules such as a geographic downscaling module 28 that employs a ridge regression (Tikhonov regularization) or elastic net regression to generate geographically downscaled data. The geographic downscaling module 28 utilizes the group 41 of high speed multiple core processors and memory to execute the associated regressions and then send the downscaled data for further processing.

In reference to FIG. 5 again, the set of modules 26 includes a downscaling module which is a temporal downscaling module 30. In various implementations, the temporal downscaling module may use a Vulcan method to generate downscaled data for the commodity wherein the downscaled data is a temporally downscaled data. The Vulcan method may be in various implementations the method disclosed in the paper by Gurney et al., entitled "The Vulcan Version 3.0 High-Resolution Fossil Fuel $CO_2$ Emissions for the United States," *Journal of Geophysical Research: Atmospheres*, V. 125 (15 Sep. 2020), the disclosure of which is incorporated entirely herein by reference. However, in other implementations, other methods of temporal downscaling of the data may be employed. The temporal downscaling module 30 utilizes the group 41 of high speed multiple core processors and memory to execute the associated regressions and then send the downscaled data for further processing.

As illustrated in FIG. 5, the set of modules 26 may include one or more quality check modules wherein the quality check modules may be a geographic quality check module 32 (geographic downscaling quality check module). As illustrated, the geographic quality check module 32 utilizes the group 41 of high speed multiple core processors and memory to generate quality checked geographic data. The set of modules 26 may also include one or more additional quality check modules wherein the one or more additional quality check modules is a temporal quality check module 36 (temporal downscaling quality check module). Following the processing of the data by the geographic downscaling module 28 and geographic downscaling quality check module 32, a first merge module 34 is used to merge the geographically downscaled commodity data and quality checked geographic data for storage. Similarly, following processing by the temporal downscaling module 30 and temporal downscaling quality check module 36, a second merging module 38 is used to merge the temporally downscaled commodity data and quality checked temporal data for storage. Both the first merging module 34 and the second merging module 38 may utilize the group 41 of high speed multiple core processors to perform the merging operation using the associated memory.

Figure 6:
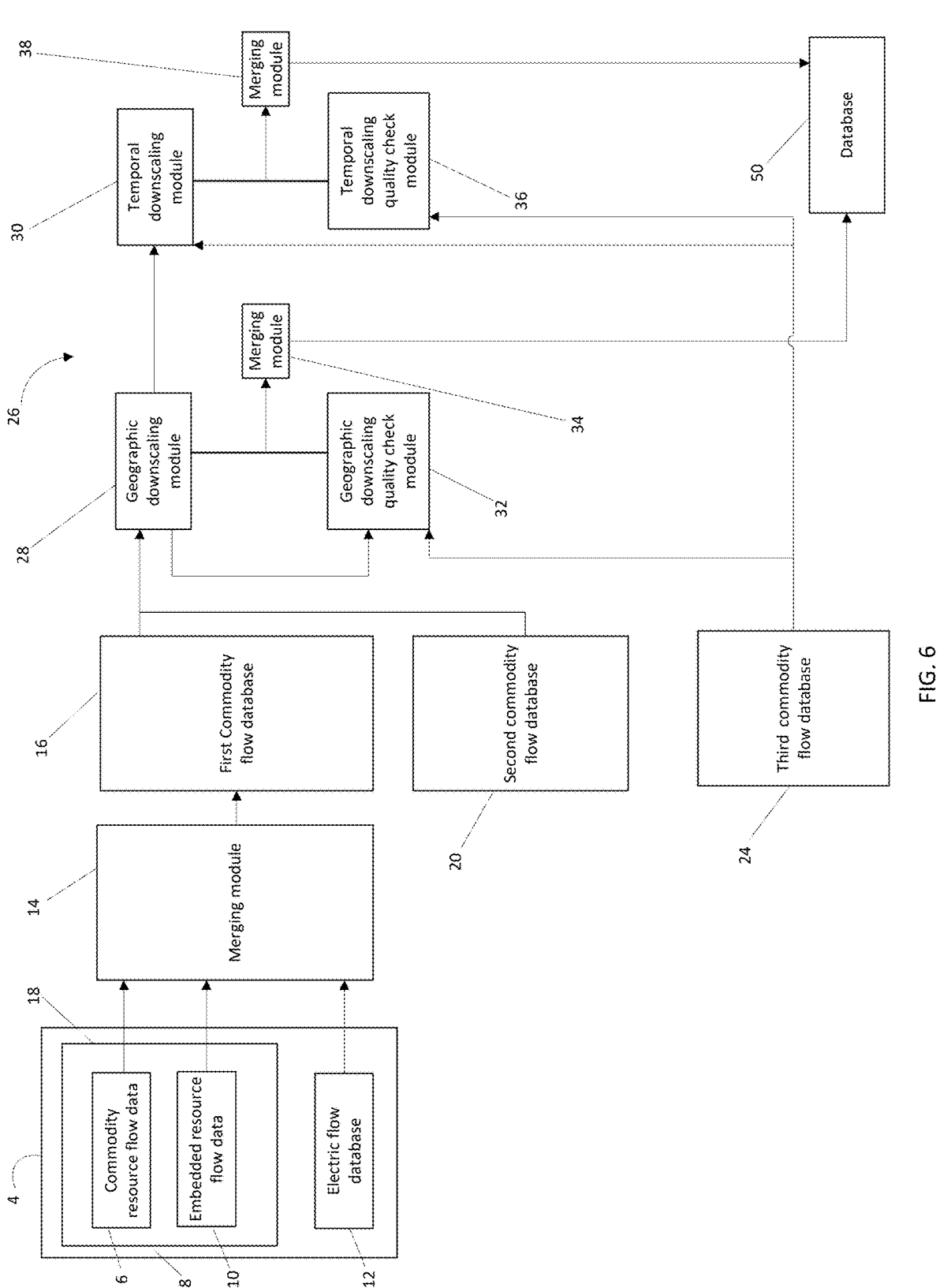
FIG. 6 is a block diagram of an implementation of a multicore downscaling system showing the various databases and processing modules.

Referring to FIG. 6, a block diagram of the multicore downscaling system that includes components from FIGS. 2-5 is illustrated that includes one or more commodity flow databases 4 that provide commodity resource flow data 6 and embedded resource flow data 10 from commodity flow database 8 along with electric flow database 11 that provides electricity data. In reference to FIG. 6 again, in this implementation the downscaling system includes a merging module 13 configured to merge the commodity flow resource flow data 6 and the embedded resource flow data 10 from the commodity resource flow database 8 and the electricity data from the electric flow database 11 to form a first commodity flow database 16 at a first level of geographic granularity and a first level of temporal granularity. As illustrated, the multicore downscaling system includes a second commodity flow database 20 like that illustrated in FIG. 3 configured to provide commodity data for a plurality of commodities at a second level of geographic granularity and a second level of temporal granularity. As illustrated, the system includes a third commodity flow database like that illustrated in FIG. 4 that provides data associated with county level data based on transit mode connectivity and the relative share of consumption activities with a metropolitan area.

Referring to FIG. 6 again, a set of modules like those illustrated in FIG. 5 of that process the data downscaling and quality checking operations for all commodities is illustrated. These modules are implemented/operated using the group 41 of high speed multiple core processors illustrated in FIG. 5 but omitted for readability in FIG. 6. Geographic downscaling module 28 receives and geographically downscales data from the first and the second commodity flow databases 16, 20. The geographically downscaled data from the geographic downscaling module 28 may be checked for quality by geographic downscaling quality checking module 32 or may pass directly to merging module 34. The data from the third commodity flow database may be directly checked for quality by the geographic downscaling module quality check module 32. Referring to FIG. 6 again, the first merge module 34 coupled with the geographic downscaling module 28 and the geographic downscaling quality check module 32 merges the geographically downscaled quality checked data from the geographic downscaling quality check module 32 and the downscaled data from the geographic downscaling module 28 and then sends it for storage in commodity flow database 50.

In various implementations, the geographically downscaled data from the geographic downscaling module 28 is configured to be processed by a temporal downscaling module 30. In one implementation, the temporal downscaling module 30 may be configured to process data provided by the third commodity flow database 24. In some implementations, the temporal downscaled data from the temporal downscaling module 30 is subjected to a quality check using temporal downscaling quality checking module 36. The temporal downscaling quality checking module 36 also may receive data from the third commodity flow database 24 directly. Once the data in the temporal downscaling module 30 and the temporal downscaling quality checking module 36 is downscaled and checked for quality, the resulting data is then merged using the second merge module 38. In one implementation the first merge module 34 and the second merge module 4380 are configured to write the processed data asynchronously according to First In First Out queue system to create a commodity flow database 50, which in various implementations is a Version 2.0 database like those discussed previously in this document.

Figure 7:
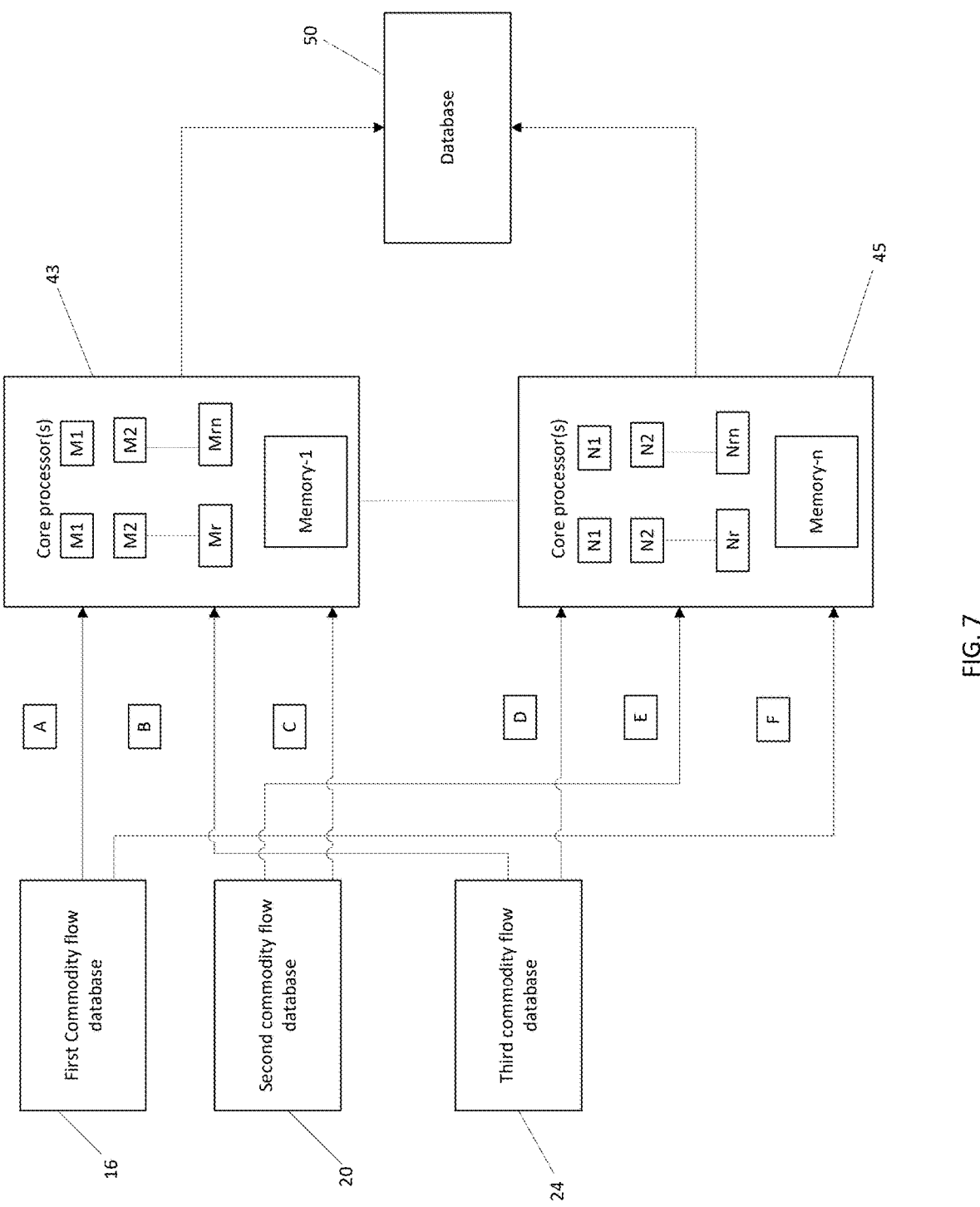
FIG. 7 is a block diagram of an implementation of processing modules used for parallel downscaling, performing quality check, merging and storing in an implementation of a multicore downscaling system.

Referring to FIG. 7, two groups 43, 45 of high speed multiple core processors are illustrated that implement downscaling of data that are designed to carrying out the various module operations for all the commodities being processed. As illustrated in FIG. 7, each commodity A-F of the group of commodities in the first commodity flow database 16, second commodity flow database 20, and third commodity flow database 24 are assigned a separate processor core with corresponding associated memory M1, M2, Mr, N1, N2, and Nr for downscaling operations. The various processor cores then respectively perform the geographic downscaling, geographic downscaling quality control, temporal downscaling, and temporal downscaling quality control along with the associated merging operations for each of the commodities. Each processor core then writes the resulting merged data to the commodity flow database asynchronously as the processing is completed. This ability to assign commodities to cores and write the data asynchronously as it is process by each core can significantly reduce the amount of memory required and increase the efficiency of the data processing operation both for high speed multiple core processors and for multiple core processors like those found in laptop and desktop computing systems.

Referring to FIG. 8, an implementation of a method of generating first and second commodity flow databases for processing using high speed multicore processors 40 is illustrated. As illustrated, the method includes providing one or more commodity flow databases including commodity and embedded resource flow data (step 42). These databases could be any containing commodity data previously discussed in this document in various implementations. The method also includes providing an electric flow database that includes electricity data (step 44). This electricity data may be any data describing flows of electricity, generation of electricity, consumption of electricity, and/or storage of electricity in a particular geographic area of interest in various implementations. The method also includes merging the commodity and embedded resource flow data from the one or more commodity flow databases with the electricity data from the electric flow database using a merging module to form a first commodity flow database (step 44). In various implementations, this first commodity flow database includes data at a first particular level of granularity with respect to size of geographic area(s) covered and time. The method also includes generating a second commodity flow database including commodity data for a plurality of commodities (step 45). In various implementations, this second commodity flow database includes data at a second particular level of granularity with respect to size of geographic areas(s) covered and time. In some implementations, the first particular level of granularity is different from the second particular level of granularity.

Referring to FIG. 9, a flow chart of a method of downscaling data, performing quality checks on the data, and asynchronously merging the downscaled and quality checked data for storage within a period of hours 46 is illustrated. As illustrated, the method 46 includes processing data associated with a commodity in the second commodity flow database and the electricity data from the first commodity flow database using an assigned core of a group of high speed multiple core processor clusters with associated memories coupled with the first commodity flow database (step 47). While high speed multiple core processors are disclosed to be used in the method implementation illustrated in FIG. 9, in other implementations, a multiple core processor like that used in a laptop or desktop could be utilized. The method also includes downscaling to generate downscaled data for the commodity including one or more downscaling modules coupled with the first commodity flow database and with the second commodity flow database in parallel. The method also includes quality checking to generate quality checked data for the commodity using one or more quality check modules coupled with a third commodity flow database (step 48). The method also includes merging the downscaled data and the quality checked data using one or more first merging modules in parallel with one or more second merging modules to generate merged data (step 49). The method also includes storing the merged data asynchronously according to a first in first out queue system in a commodity flow database in a period of hours (step 51).

The foregoing methods permit the downscaling, quality control, and merge operations to be all carried out in parallel using just the memory assigned to each core of each processor, thus reducing the total quality of memory required to process all of the commodities at the same time. Similarly, as with the original Version 1.0 workflow, the quality control operations are used to ensure that the data produced by the downscaling operations is properly correlated to/associated with the various geographic areas and temporal time scales the downscaling has been designed to achieve. To enable the use of the parallel processing by commodity, the database module is designed to write the data received from each processor asynchronously as it exits each merge operation in a first in first out approach until all of the commodity data has been processed. In this implementation, the ability to assign each commodity being downscaled to a dedicated core of a processor and then asynchronously write the merged data to the commodity flow database is what has been observed to create the unexpectedly good result of being able to perform all of the data operations needed to create a Version 2.0 database in a matter of hours rather than days as required by the Version 1.0 workflow.

Figure 10:
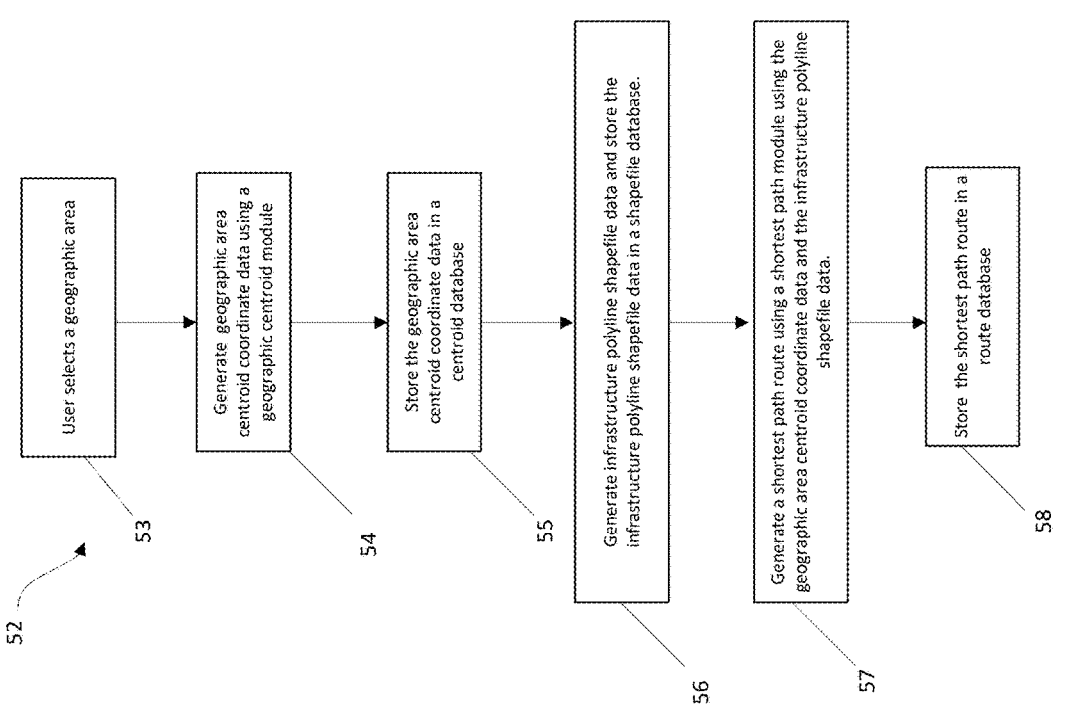
FIG. 10 is a flow diagram of an implementation of a method of generating a shortest path route by using a shortest path module through providing the shortest path module the geographic centroid coordinates and polyline shapefile data for a selected geographic area.

Referring to FIG. 10, a flowchart of an implementation of a method of generating a shortest path route by using a shortest path module through providing the shortest path module the geographic centroid coordinates and polyline shapefile data for a selected geographic area 52. This method implementation utilizes various input data categories, such as, by non-limiting example, geographic coordinates and community type. The method also employs a multitype/multimode infrastructure network identifying modalities and distances between waypoints. In particular implementations, the infrastructure network may include all transit options, timing of flows at each origin, destination, and waypoint, identity of operators of the same, and the origin-destination flow data. The various method implementations disclosed herein may be adapted to use with all kinds of geographic boundaries (counties, metropolitan areas, states, countries, etc.), all types of infrastructure networks (road, train, waterway, pipeline, air, etc.), all types of waypoints, all types of operators of infrastructure, or types of flows involved. Additionally, method implementations disclosed herein may work for all combinations of infrastructure networks and commodities.

Referring to FIG. 10, the method includes receiving a selection of a geographic area from a user (step 53). By "geographic area" is meant, by non-limiting example, the selection of a destination point, a starting point and an ending point, two or more destination points, or two dimensional geographic area(s) as either a starting area, a destination area, or both. After receiving the selection of the geographic area, the method includes calculating/generating a set of geographic area centroid coordinates for the area using a geographic centroid module (step 54). The centroid coordinates may be used to assist with the routing calculations between the starting point(s) and destination point(s) across a given geography. The method also includes storing the geographic area centroid coordinate data in a centroid database (step 55). Data from a database included in the system that includes infrastructure polyline shapefiles is then used in the method implementation to generate an infrastructure polyline shapefile data and store the infrastructure polyline shapefile data in a shapefile database (step 56). The method also includes generating a shortest path route using a shortest path module using the geographic area centroid coordinate date and the infrastructure polyline shapefile data (step 57). In various implementations, the shortest path module may employ Djikstra's routing algorithm. A wide variety of variables may be employed with the shortest path module as variables to construct a cost function used to calculate the shortest route including, by non-limiting example, travel time, distance, transport modality cost per mile, or any other cost-related variable in various implementations. The use of Djikstra's algorithm is used in shortest path module of FIGS. 14 and 15, though the shortest path module may utilize other cost function types c in various implementations, including, by non-limiting example, probabilistic algorithms, optimization algorithms based on the security, duration, storage and warehousing capacity, route flow capacity, or cost of the route, or other cost functions. Additional information regarding Djikstra's algorithm may be found in the paper to E. W. Dijkstra, "A note on two problems in connexion with graphs," *Numerische Mathematik*, V. 1, 269-271 (1959), the disclosure of which was filed as Appendix A with the '468 Provisional and is hereby incorporated entirely herein by reference.

Figure 14:
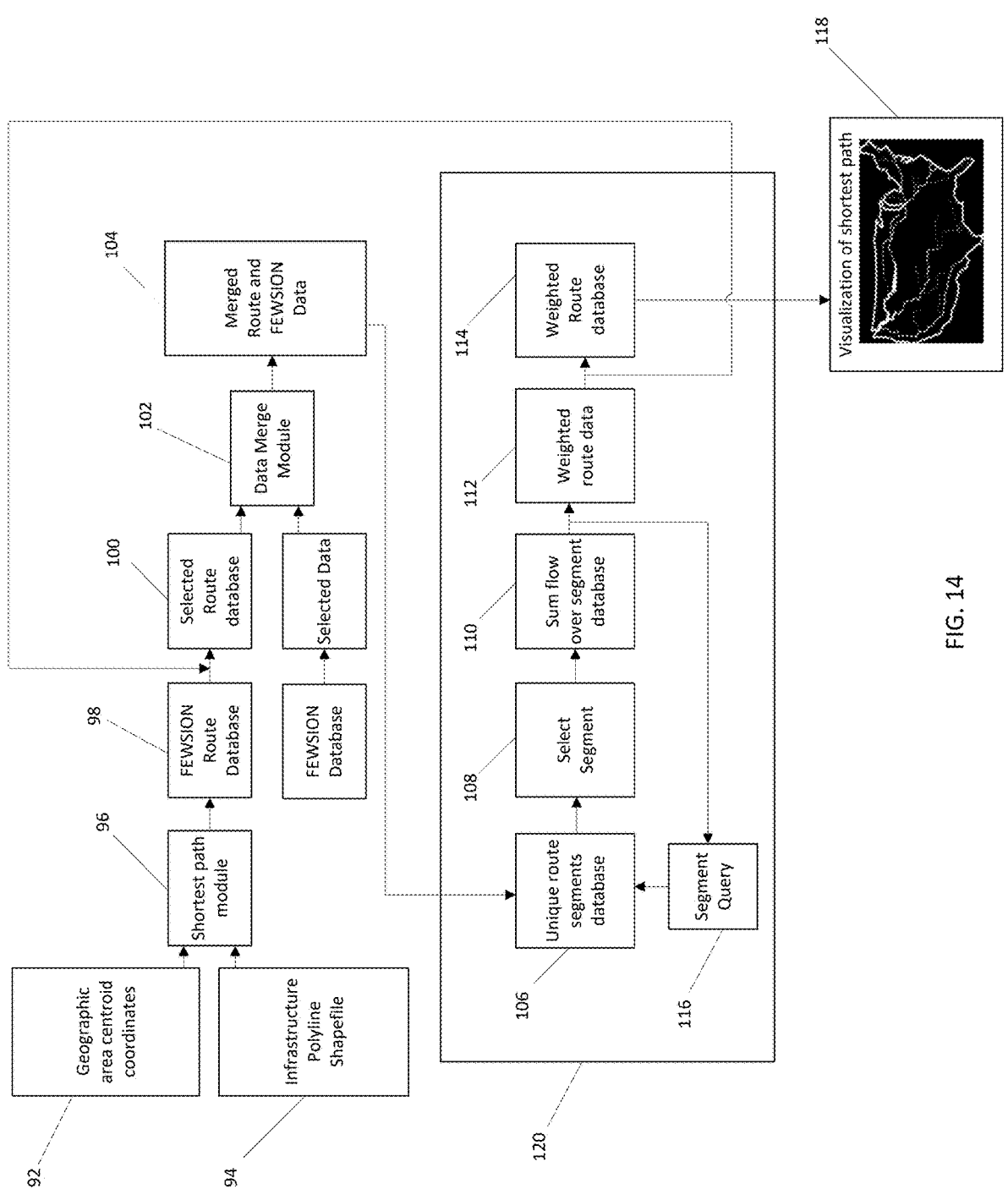
FIG. 14 is a block diagram of an implementation of a system for creating a visualization of routing of a commodity across a geographic area.

Referring to FIG. 10, the method includes storing the shortest path route in a route database (step 58) (FEWSION Route Database 98 in FIG. 14) for subsequent use. As illustrated in FIG. 14, the destination geographic area information is then used in combination with data from a database of geographically organized commodity data (FEWSION Data) to select commodity data and route data for merging and storage in a database of merged route data (Merged Route & FEWSION Data).

Figure 11:
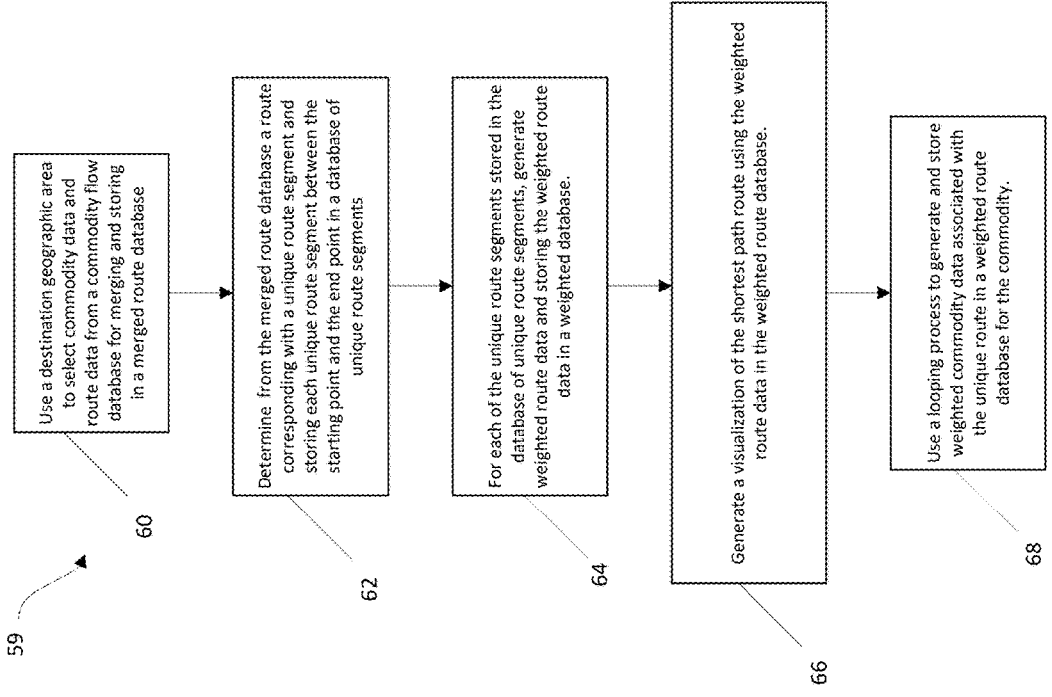
FIG. 11 is a flow diagram of an implementation of a method of generating a visualization of routing of a commodity across a geographic area.

Referring to FIG. 11, a flow diagram of an implementation of a method of generating a visualization of routing of a commodity across a geographic area 59 is illustrated. The method includes using a destination geographic area to select commodity data and route data from a commodity flow database for merging and storing in a merged route database (step 60). The method also includes determining from the merged route database a route corresponding with a unique route segment and storing each unique route segment between the starting point and the end point in a database of unique route segments (step 62). The method also includes, for each of the unique route segments stored in the database of unique route segments, generating weighted route data and storing the weighted route data in a weighted database (step 64). The method also includes generating a visualization of the shortest path route on a computer interface using the weighted route data in the weighted route database (step 66). FIG. 11 also illustrates that in various implementations, the process of generating route data and storing the weighted route data in a weighted route database may further include using a looping process to generate and store weighted commodity data associated with the unique route in a weighted route database for the commodity (step 68).

Figure 12:
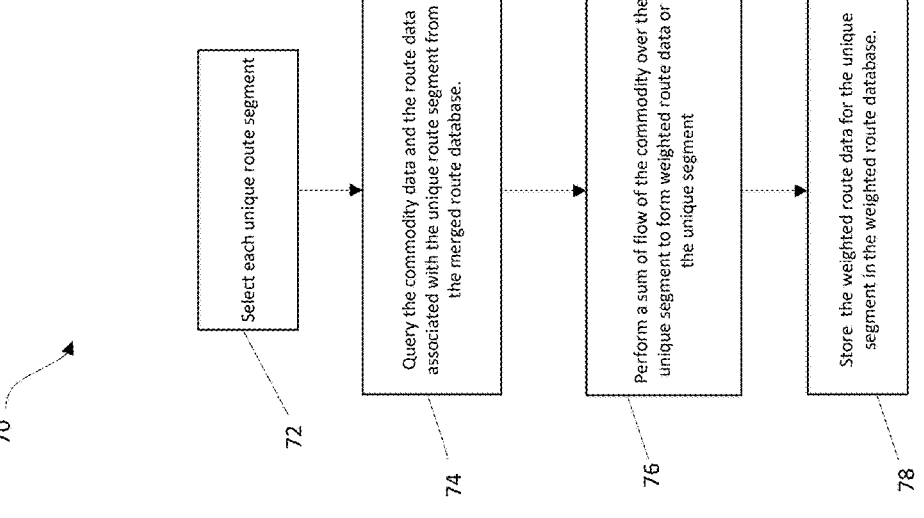
FIG. 12 is a flow diagram of an implementation of a looping process used for selecting a unique route segment for forming a weighted route data for the unique segment.

Referring to FIG. 12, a flow diagram of an implementation of a looping process used for selecting a unique route segment for forming a weighted route data for the unique segment 70 is illustrated. As illustrated, the method includes selecting each unique route segment (step 72) and querying commodity data and the route data associated with the unique route segment from the merged route data database (step 74). The method also includes performing a sum of flow of the commodity over that unique segment to form weighted route data for the unique segment (step 76) and then storing the weighted route data associated with the unique segment in a weighted route data database for the selected commodity (step 78). In various implementations, the foregoing method operations are performed for each origin, designation, and commodity combination and the results from each combination stored in the weighted route database. The route data in the weighted route database can be used by the system to generate a wide variety of visualizations of the route in a computer interface generated on a computing device associated with a user (like the visualization illustrated in FIG. 15, for example).

Figure 13:
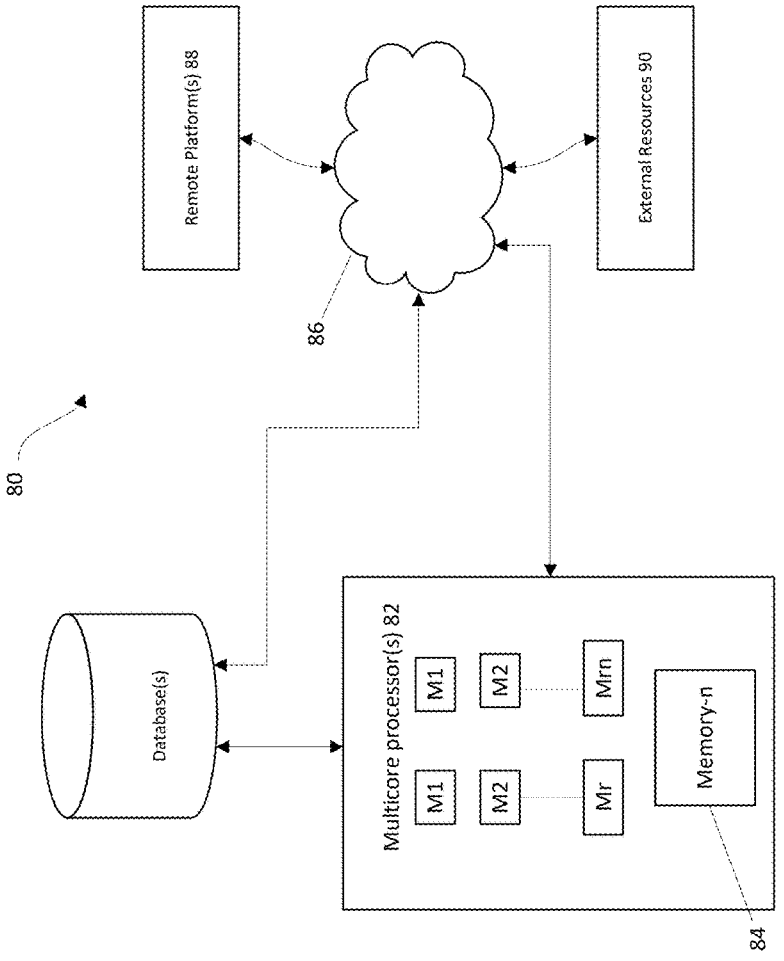
FIG. 13 is a block diagram of an implementation of a multicore downscaling system.

Referring to FIG. 13, an implementation of a computing system 80 capable of executing the various methods disclosed in this document and the functions of the corresponding disclosed modules is illustrated. As illustrated, the system 80 includes multicore processor(s) 82 operatively coupled with memory 84. In some system implementations, the system may be a high-performance computing system that includes a number of processors operatively coupled together with a large quantity of memory to form a supercomputing cluster or supercomputer. In other system implementations, the processor(s) 82 and memory 84 may be included in various server computers that are networked together using cloud computing resource 86. In other implementations, the various processor(s) and memory 84 may be networked together directly or indirectly through various wired and/or wireless networking interfaces. Further, as illustrated in FIG. 13, various additional remote computing platforms 88 and other external resources 90 may be operatively coupled with the processor(s) 82 and memory 84 either through the cloud computing resource 86 or a directly network or other wired or wireless telecommunication connection. Various database(s) are also operatively coupled with the processor(s) 82 and memory 84 using a direct wired connection, a network wired connection, a wireless connection, or any combination thereof. A wide variety of database types may be employed in various system implementations including stand-alone database computers, cloud-based database computers, databases coupled with a high-performance computing system, or databases included in one or more server computers operated by the processor(s) 82 and memory 84. The functions of the various system modules disclosed herein may be implemented using machine readable instructions stored in the memory 84 by the processor(s) 82. A wide variety of system implementations can be constructed depending upon the size of the datasets that need to be processed and the number of commodities whose flow is being modeled. The method implementation illustrated in FIG. 13 utilizes a many-to-one network. For example, many trade origins are correlated with one trade destination or vice versa. In other method implementations, however, one-to-one and many-to-many networks and multiplex/multitype networks are also appropriate.

Referring to FIG. 14, a block diagram of another implementation of a system for creating a visualization of the routing of a commodity across a geographic area is illustrated. As illustrated, the system is designed to receive a selection from a user of one or more geographic areas and of one or more commodities using a computer interface (not shown in FIG. 14) and then perform a geography query and an infrastructure query of a database containing geographically arranged commodity data (FEWSION query) for the commodity(ies) and geographic area(s). The output of the queries is then supplied to an infrastructure polyline shapefile module 94 and to a geographical area centroid coordinate module 92. Various method implementations then select one or more infrastructure types and one or more coordinates along the possible routes between the geographic areas and the selections are supplied to the lowest cost route module/shortest path module 96 (which may use Dijikstra's routing algorithm).

As illustrated in FIG. 14, the lowest cost route module/shortest path module 96 employs Djikstra's algorithm (shortest path algorithm) using travel time or distance (or any other cost variable disclosed herein) as a cost function. However, other cost functions may be employed in various lowest cost route modules to process all known/possible combinations of commodity trade networks and infrastructure networks to derive the shortest paths between all known locations over every known infrastructure network. In various other implementations, other algorithms, including probabilistic algorithms or algorithms that optimize based on the security, duration, storage and warehousing capacity, route flow capacity, or cost of the route, could be employed in the lowest cost route module. The output of the shortest path module 96 is a route that is stored in the FEWSION route database 98. A particular route is then selected and stored in the selected route database 100.

The commodity flow data from the commodity flow database (FEWSION Database) previously described is then merged with the routing data from the shortest path/lowest cost route module 96 using a data merge module 102 using an efficient algorithm to produce a merged route database 104 (Merged Route and FEWSION Data) with routes that are constrained to the geographical locations and boundaries specified in the data query, to significantly reduce the size of the resulting output (which can be of non-trivially large computational size in various implementations). The routing algorithm utilized in various implementations works for one or multiple origins or destinations at a time and for one or multiple commodities at a time. First, the commodity flow data from the commodity flow database is queried for all trades related to an origin or destination. After this query is performed, the origins and destinations are converted into latitude and longitude coordinates, so that a trade flow takes the form of origin coordinates, destination coordinates, and value of trade represented by a metric of dollars, tonnes, virtual water, million cubic feet, etc. Once a trade is converted into the coordinate form, the origin and destination information can be processed, in a particular implementation, using Djikstra's algorithm. As trades represented by origin coordinates, destination coordinates, and trade value are processed, the route information along with trade value information is stored into two output formats. The first format is as a library of individual routes between an origin and destination corresponding to a trade flow and the second format is as a merged route file which is a concatenation of all routes for a selected origin or destination. In various implementations, all identified routes are merged into one geospatial boundary file (e.g. a shapefile).

Figure 15:
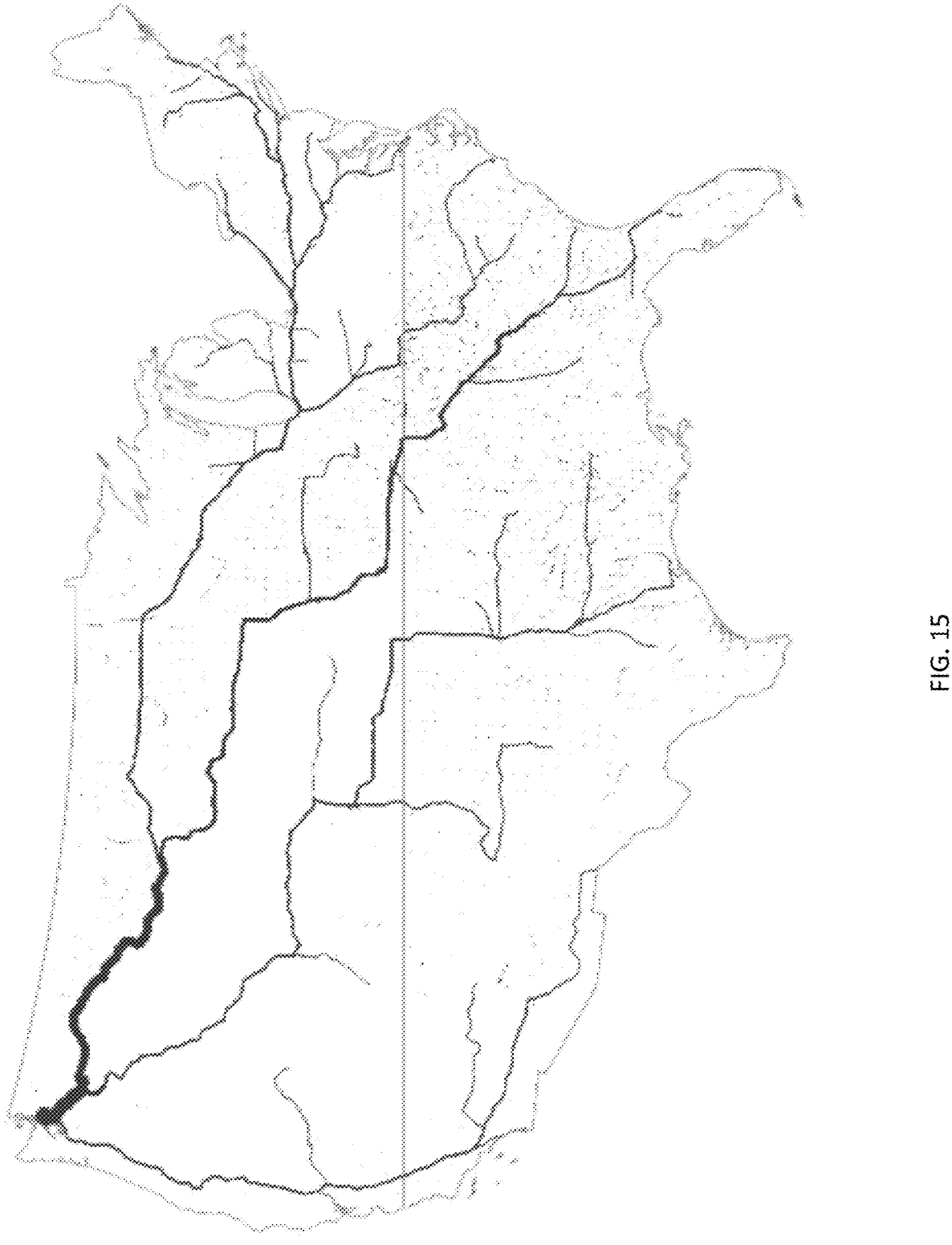
FIG. 15 is an illustration of an implementation of a visualization of routes of a commodity across a geographic area.

As illustrated in FIG. 14, the system a unique segment module 120 applies an algorithm to efficiently identify unique segments in the merged route database/merged route and FEWSION data database 104. In a particular implementation, one or more routes and one or more unique segments are processed by the module 120 as test MultiLine Strings so that each route is a combination of one or more unique segments represented by starting and ending coordinates relating to the resolution of the infrastructure network data. As illustrated in FIG. 15, the unique segments are taken by processing using the merged route database 104. For each one or more unique segment, the module 120 searches each individual route file in the merged route database 104 for the presence of that unique segment.

In reference to FIG. 14 again, each time a unique segment is found in an individual route by the module 120, the unique segment is added to the unique segment database 106. As each unique segment is identified in the merged route database 104, each unique segment is then selected by the module (step 108) and a sum of flow(s) over that segment is then carried out and stored in sum flow over segment database 110. As illustrated, this process of calculating the sum of the flows over each unique segment takes the form of a looping process. For each instance a unique segment is found, its segment and trade value are then added to the sum flow over segment database 110. Each subsequent instance a unique segment is found, if that unique segment already has been identified and stored in the sum flow over segment database 110, the newly identified additional trade value is aggregated with the existing trade value in the sum flow over segment database 152 associated with that unique segment. In various implementations, the merged route database 104 can also be queried using a segment query module 116 employing a single-threaded for loop or an efficient multi-processing algorithm to find each instance where a route segment is included in all known routes. Following the identification by the module 120 of these unique route segments and the storage of the related trade value in the sum flow over segment database, an efficient multiprocessing algorithm is employed by the unique segment module 120 where the activity of searching the sum flow over segment database 110 for the presence of a specific unique segment is assigned to an individual core in a multi-core processor(s) associated with the system. The ability to assign the processing of a specific unique segment to an individual core allows for the simultaneous processing of as many unique segments as are equal to the number of cores the processor(s) contains. The multiprocessing application produces the sum of the flows over each unique segment so that, once the multiprocessing algorithm is completed, the data in the sum flow over segment database 110 is turned into weighted route data 112 that is then stored and merged into one weighted route database 114. The multiprocessing algorithm utilized by the unique segment module 120 is applied to sum the total flow of trade over each unique route segment for any of a wide variety of variables, such as, by non-limiting example, waypoint transfer, storage transfer, intermodal-transfer, operator, mode, time period, or any other route-related variable.

Further, as illustrated in FIG. 14, in the various system implementations, the resulting weighted route data in the weighted route database 114 is processed using another efficient multiprocessing algorithm to compare the calculated route totals with the capacity (if known) of the routes, and, various implementations, recursively reroutes the unique route if necessary across the multitype/multiplex route network to find a valid flow solution. Similarly, this algorithm may use a multiprocessing framework like those disclosed herein to process each individual route segment using a unique core of a multicore processor(s) to compare with capacity, annual average daily traffic, average annual daily single unit truck traffic, among other candidates. If no valid flow solution across a given unique route is available, the shortfall in flow capacity may be returned to the weighted route database 114 that includes the weighted flow data in addition to the closest flow solution.

After processing by the unique route module 120, the route data in the weighted route database 114 may be used by the system to generate a wide variety of visualizations of the route like the visualization 118 on a computer interface generated on a computing device associated with a user. Another example of a visualization that can be displayed on a computer interface is the visualization illustrated in FIG. 15.

Any of the various system and method implementations disclosed herein include generating a route visualization (FEW-View). In various implementations, this may be done as route segments are queried and summed. The resultant data is then used to populate an efficient geospatial data structure, such as, by non-limiting example, shapefile, geoJ- SON, well known text (WKT) comma separated values (CSV) file, or any other geospatial data structure. The resulting geospatial data structure is then processed by the system and included in a computing interface generated by/sent to a computing device associated with the user. An example of such a visualization is the flow-weighted route network illustrated in FIG. 15, which shows the flow of a commodity to the Seattle, Washington area.

The implementations listed here, and many others, will become readily apparent from this disclosure. From this, those of ordinary skill in the art will readily understand the versatility with which this disclosure may be applied. In places where the description above refers to particular implementations of multicore data downscaling and routing visualization systems and implementing components, sub-components, methods and sub-methods, it should be readily apparent that a number of modifications may be made without departing from the spirit thereof and that these implementations, implementing components, sub-components, methods and sub-methods may be applied to other multicore data downscaling and routing visualization systems and related methods

What is claimed is:

1. A method of visualizing a flow of a commodity in a supply chain route, the method comprising:

generating geographic area centroid coordinate data using a geographic area centroid module, a starting point, and an endpoint in response to receiving a selection of a geographic area by a user and storing the geographic area centroid coordinate data in a centroid database;

generating infrastructure polyline shapefile data and storing the infrastructure polyline shapefile data in a shapefile database;

generating a shortest path route using a shortest path module wherein a shortest path is generated using the geographic area centroid coordinate data and the infrastructure polyline shapefile data;

storing the shortest path route in a route database;

using a destination geographic area to select commodity data and route data from a commodity flow database for merging and storing in a merged route database;

determining from the merged route database a route corresponding with a unique route segment and storing each unique route segment between the starting point and the end point in a database of unique route segments;

for each of the unique route segments stored in the database of unique route segments, generating weighted route data and storing the weighted route data in a weighted route database; and generating a visualization of the shortest path route using the weighted route data in the weighted route database.

2. The method of claim 1, wherein generating weighted route data and storing the weighted route data in a weighted route database further comprises:

using a looping process to generate and store weighted commodity data associated with a unique route in a weighted route database for the commodity by:

selecting each unique route segment;

querying the commodity data and the route data associated with the unique route segment from the merged route data database;

performing a sum of a flow of the commodity over the unique segment to form weighted route data for the unique segment; and storing the weighted route data for the unique segment in the weighted route database.

3. The method of claim 1, wherein the shortest path module uses Dijikstra's routing algorithm to determine the shortest path route.

4. The method of claim 1, wherein selection of a commodity is received from a user.

5. The method of claim 1, wherein the visualization indicates a quantity of flow of the commodity by a width of a flow line on the visualization passing across a geographic area.

6. A system for visualizing a flow of a commodity in a supply chain route, the system comprising:

using one or more multicore processors configured using computer readable instructions comprised in computer readable media to:

use a geographic area centroid module, generate geographic area centroid coordinate data from a starting point and an endpoint in response to receiving a selection of a geographic area by a user and storing the geographic area centroid coordinate data in a centroid database;

generate infrastructure polyline shapefile data and store the infrastructure polyline shapefile data in a shapefile database;

use a shortest path module, generate a shortest path route wherein the shortest path route is generated using the geographic area centroid coordinate data and the infrastructure polyline shapefile data;

store the shortest path route in a route database;

use a destination geographic area to select commodity data and route data from a commodity flow database for merging and storing in a merged route database;

determine from the merged route database a route corresponding with a unique route segment and storing each unique route segment between the starting point and the end point in a database of unique route segments;

for each of the unique route segments stored in the database of unique route segments, generating weighted route data and storing the weighted route data in a weighted route database; and generate a visualization of the shortest path route using the weighted route data in the weighted route database.

7. The system of claim 6, wherein generating weighted route data and storing the weighted route data in a weighted route database further comprises wherein the one or more multicore processors are configured to:

use a looping process to generate and store weighted commodity data associated with a unique route in a weighted route database for the commodity by:

selecting each unique route segment;

querying the commodity data and the route data associated with the unique route segment from the merged route data database;

performing a sum of a flow of the commodity over the unique segment to form weighted route data for the unique segment; and storing the weighted route data for the unique segment in the weighted route database.

8. The system of claim 6, wherein the shortest path module uses Dijikstra's routing algorithm to determine the shortest path route.

9. The system of claim 6, wherein selection of a commodity is received from a user.

10. The system of claim 6, wherein the visualization indicates a quantity of flow of the commodity by a width of a flow line on the visualization passing across a geographic area.

11. A method of visualizing a flow of a commodity in a supply chain route, the method comprising:

receiving a selection of a geographic area by a user using a computer interface and determining a starting point and an endpoint and retrieving geographic area centroid coordinate data from a centroid database;

retrieving infrastructure polyline shapefile data from a shapefile database;

generating a shortest path route using a shortest path module wherein a shortest path is generated using the geographic area centroid coordinate data and the infrastructure polyline shapefile data;

storing the shortest path route in a route database;

using a destination geographic area to select commodity data and route data from a commodity flow database for merging and storing in a merged route database;

determining from the merged route database a route corresponding with a unique route segment and storing each unique route segment between the starting point and the end point in a database of unique route segments;

for each of the unique route segments stored in the database of unique route segments, assigning each unique route segment to a core comprised in a multi-core processor and generating weighted route data using the core;

storing the weighted route data in a weighted route database; and generating a visualization of the shortest path route using the weighted route data in the weighted route database.

12. The method of claim 11, wherein generating weighted route data and storing the weighted route data in a weighted route database further comprises:

using a looping process to generate and store weighted commodity data associated with a unique route in a weighted route database for the commodity by:

selecting each unique route segment and assigning the core comprised in the multi-core processor;

using the core:

querying the commodity data and the route data associated with the unique route segment from the merged route data database;

performing a sum of a flow of the commodity over the unique segment to form weighted route data for the unique segment; and storing the weighted route data for the unique segment in the weighted route database.

13. The method of claim 11, wherein the shortest path module uses Dijikstra's routing algorithm to determine the shortest path route.

14. The method of claim 11, wherein selection of a commodity is received from a user.

15. The method of claim 11, wherein the visualization indicates a quantity of flow of the commodity by a width of a flow line on the visualization passing across a geographic area.

* * * * *